(12) United States Patent
Moldoveanu et al.

(10) Patent No.: US 8,588,025 B2
(45) Date of Patent: Nov. 19, 2013

(54) METHOD AND APPARATUS FOR ACQUIRING WIDE-AZIMUTH MARINE DATA USING SIMULTANEOUS SHOOTING

(75) Inventors: Nicolae Moldoveanu, Houston, TX (US); Craig J. Beasley, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 485 days.

(21) Appl. No.: 12/649,818

(22) Filed: Dec. 30, 2009

(65) Prior Publication Data

US 2011/0158044 A1 Jun. 30, 2011

(51) Int. Cl.
*G01V 1/38* (2006.01)
(52) U.S. Cl.
CPC .................................... *G01V 1/38* (2013.01)
USPC .......................................................... 367/15
(58) Field of Classification Search
USPC .......................................................... 367/15
See application file for complete search history.

(56) References Cited

U.S. PATENT DOCUMENTS

| | | | |
|---|---|---|---|
| 4,757,482 A | 7/1988 | Fiske, Jr. | |
| 5,924,049 A | 7/1999 | Beasley et al. | |
| 6,477,711 B1 | 11/2002 | Freeman et al. | |
| 6,671,223 B2 | 12/2003 | Bittleston | |
| 6,684,160 B1 | 1/2004 | Ozbek et al. | |
| 6,882,938 B2 | 4/2005 | Vaage et al. | |
| 6,906,981 B2 | 6/2005 | Vaage | |
| 6,932,017 B1 | 8/2005 | Hillesund et al. | |
| 7,080,607 B2 | 7/2006 | Hillesund et al. | |
| 7,293,520 B2 | 11/2007 | Hillesund et al. | |
| 7,400,552 B2* | 7/2008 | Moldoveanu et al. | 367/16 |
| 2005/0027454 A1 | 2/2005 | Vaage et al. | |
| 2007/0091719 A1* | 4/2007 | Falkenberg et al. | 367/19 |
| 2007/0159921 A1* | 7/2007 | Regone et al. | 367/15 |
| 2007/0165486 A1* | 7/2007 | Moldoveanu et al. | 367/15 |
| 2007/0258320 A1* | 11/2007 | Harrick et al. | 367/20 |
| 2008/0011540 A1 | 1/2008 | Moldoveanu et al. | |
| 2008/0267010 A1* | 10/2008 | Moldoveau et al. | 367/16 |
| 2008/0285381 A1* | 11/2008 | Moldoveanu et al. | 367/20 |
| 2010/0118645 A1* | 5/2010 | Welker | 367/17 |

FOREIGN PATENT DOCUMENTS

WO  WO 2009092069 A1 * 7/2009

OTHER PUBLICATIONS

Beasley, et al., A New Look at Simultaneous Sources, SEG Expanded Abstracts, 1998.
Lynn, et al., Experimental Investigation of Interference from other Seismic Crews, Geophysics, Nov. 1987, pp. 1501-1524, vol. 52, No. 11.
Moore, et al., But Simultaneous Source Separation using Dithered Sources, SEG Annual Meeting, 2008.
Moldoveanu, et al., Some Aspects of Survey Design for Wide-Azimuth Towed-Streamer Acquisition, SEG Annual Meeting, 2007.

(Continued)

*Primary Examiner* — Isam Alsomiri
*Assistant Examiner* — James Hulka

(57) ABSTRACT

A technique for acquiring wide azimuth seismic data using simultaneous shooting is presented in which a plurality of seismic sources are positioned to achieve a desired crossline sampling as a function of the number of passes. This is accomplished by "interleaving" sources as deployed in the spread, as positioned in multiple passes, or some combination of these things, to achieve an effective shotline interval during acquisition or an effective crossline sampling less than their crossline source separation.

18 Claims, 8 Drawing Sheets

(56) References Cited

OTHER PUBLICATIONS

International Search Report of PCT Application No. PCT/US2010/062516 dated Jul. 29, 2011: pp. 1-4.

International Preliminary Report on Patentability of PCT Application No. PCT/US2010/062516 dated Jul. 4, 2012: pp. 1-6; which contains a Written Opinion originally issued with the International Search Report dated Jul. 29, 2011.

* cited by examiner

METHOD AND APPARATUS FOR ACQUIRING WIDE-AZIMUTH MARINE DATA USING SIMULTANEOUS SHOOTING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention pertains to wide-azimuth, towed array, marine seismic surveys.

2. Description of the Related Art

This section of this document introduces various aspects of the art that may be related to various aspects of the present invention described and/or claimed below. It provides background information to facilitate a better understanding of the various aspects of the present invention. As the section's title implies, this is a discussion of "related" art. That such art is related in no way implies that it is also "prior" art. The related art may or may not be prior art. The discussion in this section of this document is to be read in this light, and not as an admission of prior art.

Illuminating reservoirs with traditional marine seismic acquisition has always been challenging. Much of the challenge has to do with the variation, or lack of it, in the azimuths of the recorded seismic ray-paths. One relatively new acquisition technique to overcome this difficulty is wide-azimuth ("WAZ") surveying. WAZ surveying is aimed at addressing the illumination problems inherent in traditional narrow-azimuth marine seismic. WAZ surveys provide a step-change improvement in imaging. These types of survey improve signal-to-noise ratio and illumination in complex geology and provide natural attenuation of some multiples.

Wide-azimuth towed-streamer surveys are acquired with multiple vessels. A typical configuration consists in two streamer vessels and two source vessels. On each vessel there is a source array and the sources fire sequentially. One implementation of wide-azimuth acquisition using this vessel configuration is to shoot in one direction with 1200 m sail line interval and then shoot in reverse direction, interleaved lines, at 1200 m sail line interval. N. Moldovenau & M. Egan, 2007, "Some Aspects of Survey Design for Wide-Azimuth Towed-Streamer Acquisition", SEG, 2007, Extended Abstracts, 56-60. This method of shooting produces shot lines at 600 m, a wide-azimuth distribution and a maximum crossline offset of 4200 m.

More particularly, the basic configuration that is used today by WesternGeco, the assignee hereof, and other companies for wide-azimuth ("WAZ") acquisition consists of two streamer vessels and two source vessels. The vessels are all aligned at the leading edge of the spread and each of the vessels tows a seismic source. The vessels' separation is 1200 m and the spread width—the crossline distance from the portside streamer to the starboard streamer in a towed streamer array—is 1200 m.

All 4 vessels sail in one direction in a first pass with an interval of 1200 m between them—that is, with a 1200 m sail line interval. The vessels sail also in the opposite direction in a second pass over the survey area. The second pass is also made using a 1200 m sail line interval. However, the sail lines of the second pass are interleaved in the sense that the vessels in the second pass traverse sail lines that are between the sail lines of the first pass. The number of sail lines that will be executed depends on the size of the survey, for example, twelve sail lines in two passes, or six sail lines in each direction.

As noted above, each of the vessels tows a seismic source. The "shot line interval" is the interval between the seismic sources. The sources are "shot" during each pass. Considering collectively the shooting in the two interleaved directions, the shot line interval is 600 m. This means that the crossline sampling is 600 m. If each seismic source fires sequentially at 37.5 m in conventional fashion, the shot interval along each source line is 150 m (37.5 m*4). This means that the inline shot sampling is 150 m. Note: if two sources are fired simultaneously, the shot interval (the inline sampling) can be reduced by 75 m.

SUMMARY OF THE INVENTION

In one aspect, a method, comprises: deploying a towed array, marine seismic spread spread; traversing the deployed spread across a survey area; and acquiring wide azimuth survey data during the traversal. Deploying the spread includes: a plurality of streamer arrays; a plurality of streamer vessels, each streamer vessel towing a respective one of the streamer arrays; a plurality of seismic sources whose positions are interleaved in the crossline direction to achieve an effective crossline sampling less than their crossline separation as a function of the number of passes; and a plurality of source vessels, each source vessel towing at least a respective one of the seismic sources;

In a second aspect, a towed array, marine seismic spread, comprises: a plurality of streamer arrays; a plurality of streamer vessels, each streamer vessel towing a respective one of the streamer arrays; a plurality of seismic sources whose positions are interleaved in the crossline direction to achieve an effective shotline interval less than their crossline separation during acquisition; and a plurality of source vessels, each source vessel towing at least a respective one of the seismic sources.

In a third aspect, a method, comprises: deploying a towed array, marine seismic spread; traversing the deployed spread across a survey area; and acquiring wide azimuth survey data during the traversal. The data acquisition includes shooting the seismic sources in combinations that are shot sequentially in an interval proportional to the number of seismic sources and the nominal shot interval and while the seismic sources are positioned in an interleaved manner to achieve an effective crossline sampling less than their crossline separation; and receiving a seismic wavefield generated by shooting the seismic sources.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The invention may be understood by reference to the following description taken in conjunction with the accompanying drawings, in which like reference numerals identify like elements, and in which.

Figure 1A:
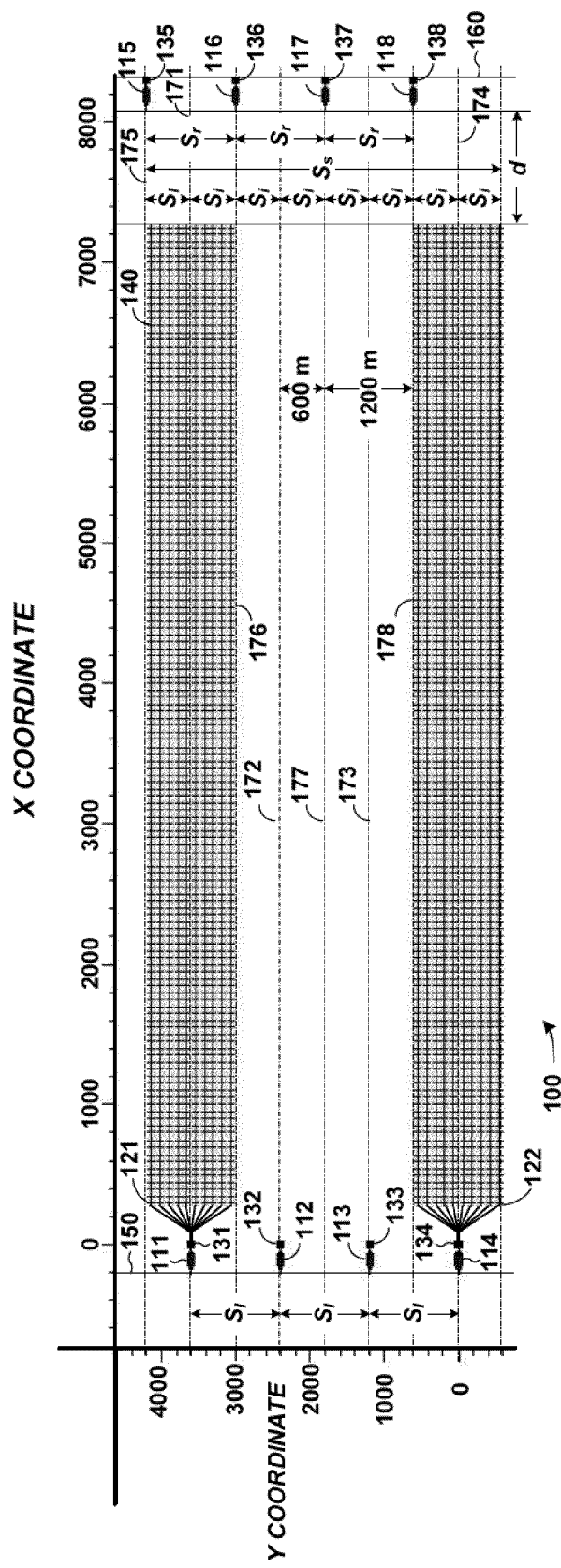
FIG. 1A-FIG. 1B conceptually illustrates in a "bird's eye" view one particular embodiment of a towed array, marine seismic survey spread implemented in accordance with one aspect of the present invention and the wide-azimuth distribution of its acquisition, respectively.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention.

FIG. 1A conceptually illustrates one particular embodiment of a towed array, marine seismic survey spread 100 implemented in accordance with one aspect of the present invention. The spread 100 comprises eight vessels 111-118, two streamer arrays 121, 122, and a plurality of sources 131-138. The vessels 111, 114 are "streamer vessels" in that they each tow a respective one of the streamer arrays 121, 122, although they also tow a respective source 131, 134. In some embodiments, streamer vessels may omit sources although additional vessels may need to be introduced for those sources. The vessels 112-113 and 115-118 are "source vessels" in that they each tow a respective source or source array 132-133 and 135-138 but no streamer arrays.

In the configuration of FIG. 1A, and as discussed in further detail below, the separation between the vessels 111-114 and 115-118 is 1200 m. Compared to conventional practice, there are four additional source vessels 115-118 that are positioned behind the streamers 140 (only one indicated) of the streamer arrays 121, 122. The source vessels 115-118 behind the streamers 140 are interleaved with the vessels 111-114 placed in front of the streamers 140. This means that the source vessel separation for the spread 100 is 600 m and the source line interval is 600 m. If we compare this with WAZ conventional practice, the same survey area can be acquired in a single pass instead of two interleaved passes.

If each source 131-138 fires sequentially, the inline shot sampling is 300 m (37.5 m×8). However, the illustrated embodiment uses simultaneous shooting in order to have a smaller shot interval, and thus a smaller sampling interval. If two sources are shot simultaneously, the shot interval is 150 m, similar with the shot sampling in the conventional WAZ survey practice described above. The sources 131-138 that could fire simultaneously could be: source 131 and source 137; source 132 and source 138; source 133 and source 135; and source 134 and source 136. Other combinations could be used, but in general one should select one source in front and one source behind that fire in the same time. The traveltimes of the sources in front and behind have different moveout and the scan therefore be more easily separated.

The inline shot interval could be reduced at 75 m if four sources are fired simultaneously, for instance, if source 131, source 133, source 135, and source 137 are shot at the same time and source 132, source 134, source 136, and source 138 are shot at the same time. Note that the notion of the sources being shot at the same time encompasses small random delays between the sources source 131, source 133, source 135, and source 137 and the same for source 132, source 134, source 136, and source 138. This will make the separation easier.

Figure 1B:
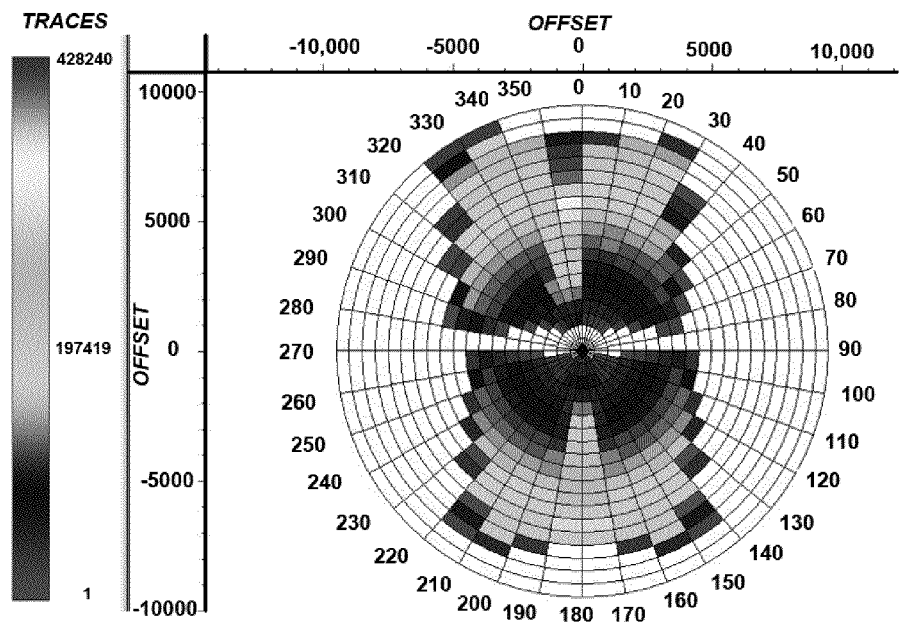

The offset-azimuth distribution for the survey conducted with the spread 100 of FIG. 1A shown in FIG. 1B and is the same as would be achieved with a conventional WAZ acquisition described above.

Each streamer array 121, 122 comprises a plurality of streamers 140 (only one indicated). The present invention admits wide variation in the implementation of the streamers 140. Examples of suitable construction techniques may be found in U.S. Pat. No. 6,477,711, U.S. Pat. No. 6,671,223, U.S. Pat. No. 6,684,160, U.S. Pat. No. 6,932,017, U.S. Pat.

No. 7,080,607, U.S. Pat. No. 7,293,520, and U.S. application Ser. No. 11/114,773, incorporated by reference below. Any of these alternative multicomponent streamers may be used in conjunction with the presently disclosed technique. However, the invention is not limited to use with multicomponent streamers and may be used with conventional, pressure-only streamers used in 2D surveys.

The illustrated embodiment uses WesternGeco Q-Marine technology that provides features such as streamer steering, single-sensor recording, large steerable calibrated source arrays, and improved shot repeatability, as well as benefits such as better noise sampling and attenuation, and the capability to record during vessel turns, all contribute to the improved imaging. More particularly, each of the vessels 111-118 is a Q™ vessel owned and operated by WesternGeco, the assignee hereof. Each vessel 111-118 is provided with a GPS receiver coupled to an integrated computer-based seismic navigation (TRINAV™), source controller (TRISOR™), and recording (TRIACQ™) system (collectively, TRILOGY™), none of which are shown. The sources 131-138 are typically TRISOR™-controlled multiple air gun sources.

Figure 2A:
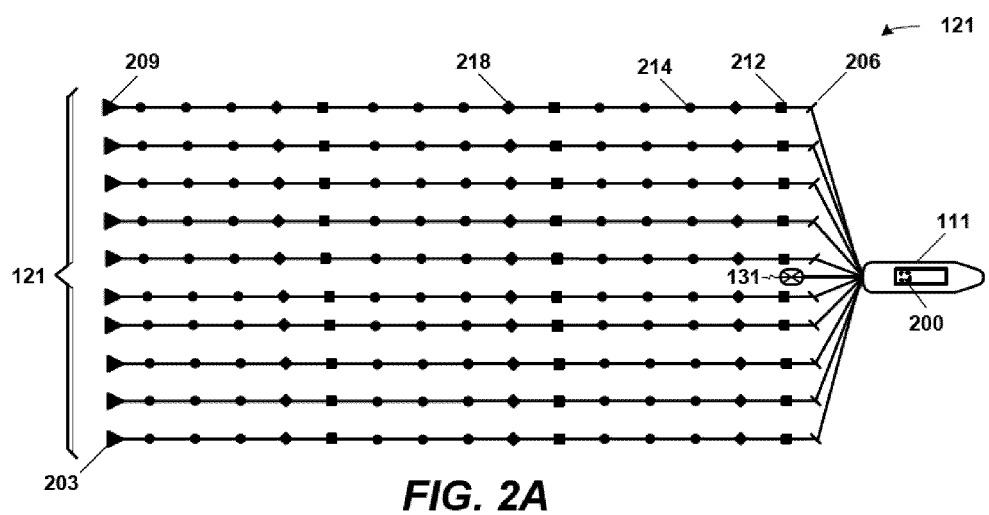
FIG. 2A-FIG. 2B depict one particular embodiment of a streamer array first shown in FIG. 1A in a plan, overhead view, including the instrumented sondes of the streamers.
Figure 2B:
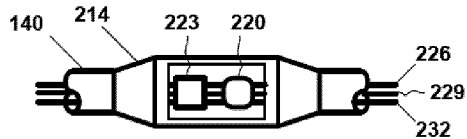

To further an understanding of the present invention, one particular embodiment of the streamer arrays will now be disclosed with respect to FIG. 2A-FIG. 2B. FIG. 2A depicts one particular embodiment of the survey vessel 111, streamer array 121, and seismic source 131 in a plan, overhead view. In this particular embodiment, as mentioned above, the seismic spread 101 generally includes an array 121 towed by a survey vessel 111 on board of which is a computing apparatus 200. The computing apparatus 200 controls the seismic spread 101 in a manner well known and understood in the art and as discussed more fully below. The towed array 121 comprises ten marine streamers 140 (only one indicated). The seismic source 131 is also included. Each streamer 140 may, for instance, be 6 km long and separated by up to 100 m. Note that the number of streamers 140 in the towed array 121 is not material to the practice of the invention.

Note that these distances discussed herein are "approximate." As used herein, the term "approximate" acknowledges that which is commonly known in the art—namely, that it is difficult to consistently maintain the position of the streamers 140 throughout the entire seismic survey 100. Environmental conditions, such as tides and winds, frequently push all or parts of the streamers 140 out of their desired positions during the survey. Accordingly, as is discussed further below, the streamers 140 include positioning devices to help offset these types of factors. Deviations from desired positions nevertheless occur and they may affect the crossline cable separation. The term "approximately" is a reflection of this reality and indicates that deviations from the modified distance that are within a degree commonly accepted by those in the industry in this context.

At the front of each streamer 140 is a deflector 206 (only one indicated) and at the rear of every streamer 140 is a tail buoy 209 (only one indicated) used to help control the shape and position of the streamer 140. Located between the deflector 206 and the tail buoy 209 are a plurality of seismic cable positioning devices known as "birds" 212. The birds 212 may be located at regular intervals along the seismic cable, such as every 200 m to 400 m. In this particular embodiment, the birds 212 are used to control the depth at which the streamers 140 are towed, typically a few meters.

The streamers 140 also include a plurality of instrumented sondes 214 (only one indicated) distributed along their length. The instrumented sondes 214 house, in the illustrated embodiment, an acoustic sensor 220 (e.g., a hydrophone) such as is known to the art, and a particle motion sensor 223, both conceptually shown in FIG. 2B. The particle motion sensors 223 measure not only the magnitude of passing wavefronts, but also their direction. The sensing elements of the particle motions sensors may be, for example, a velocity meter or an accelerometer.

The sensors of the instrumented sondes 214 then transmit data representative of the detected quantity over the electrical leads of the streamer 140. The data from the acoustic sensors 220 and the particle motion sensors 223 may be transmitted over separate lines. However, this is not necessary to the practice of the invention. However, size, weight and power constraints will typically make this desirable. The data generated by the particle motion sensor 223 will therefore need to be interleaved with the seismic data. Techniques for interleaving information with this are known to the art for interleaving may be employed.

Thus, the data generated by the sensors of the instrumented sondes 214 is transmitted over the seismic cable to the computing apparatus 200. As those in the art will appreciate, a variety of signals are transmitted up and down the streamer 140 during the seismic survey. For instance, power is transmitted to the electronic components (e.g., the acoustic sensor 220 and particle motion sensor 223), control signals are sent to positioning elements (not shown), and data is transmitted back to the vessel 111. To this end, the streamer 140 provides a number of lines (i.e., a power lead 226, a command and control line 229, and a data line 232) over which these signals may be transmitted. Those in the art will further appreciate that there are a number of techniques that may be employed that may vary the number of lines used for this purpose. Furthermore, the streamer 140 will also typically include other structures, such as strengthening members (not shown), that are omitted for the sake of clarity.

Returning to FIG. 1A, the sources 131-138 typically will be implemented in arrays of individual sources. The sources 131-138 may be implemented using any suitable technology known to the art. The known seismic sources include impulse sources, such as explosives and air guns, and vibratory sources which emit waves with a more controllable amplitude and frequency spectrum. One suitable source is disclosed in U.S. Pat. No. 4,757,482, incorporated by reference below. The embodiment illustrated in FIG. 1A simultaneously shoots several of the sources 131-138 as discussed further below. Accordingly, care should be taken so that the sources 131-138 can be separated during subsequent analysis. There are a variety of techniques known to the art for source separation and any such suitable technique may be employed.

For example, source separation is typically achieved by a source encoding technique in which one source is coherent and another source is incoherent in a certain collection domain, such as common depth point, common receiver or common offset. Another way source separation technique is disclosed in C. Beasley & R. E. Chambers, 1998, "A New Look at Simultaneous Sources", $60^{th}$ Conference and Exhibition, EAGE, Extended Abstracts, 02-38. This technique achieves source separation based on moveout and traveltime differences and permits combination of source encoding with moveout and traveltime differences.

During the survey, the spread 100 is deployed as shown in FIG. 1A. The source vessels 112, 113 are positioned on the leading edge 150 of the spread 100 with the streamer vessels 111, 114. Each of the leading edge vessels 111-114 are separated in a crossline direction by a separation interval $S_l$. The source vessels 115-118, on the other hand, are positioned at the trailing edge 160 of the seismic spread 100. They are separated from one another in a crossline direction by a separation interval $S_r$. The trailing edge vessels 115-118 are positioned between pairs of the leading edge vessels 111-114 in a crossline direction and separated by a separation interval $S_i$. In the illustrated embodiment, $S_i=S_r=1200$ m and $S_i=600$ m.

Note that, as is shown in FIG. 1A, the leading edge sources 131-134 and the trailing edge sources 135-137 bracket the streamer arrays 121, 122 in the inline direction. The inline distance d by which the trailing edge vessels 115-118 trail the streamer arrays 121, 122 is not material to the practice of the invention. However, practical considerations such as environmental conditions will inform those conducting survey what types of distances may be advisable for the given survey. In the illustrated embodiment, the distance d=700 m. Note also that all of the vessels 111-118 are positioned in a crossline direction within the maximum spread separation $S_s$, and that the trailing edge vessels 115-118 are bracketed in the crossline direction by the leading edge vessels 111-114.

During acquisition, each of the vessels 111-118 traverses a respective sail line 171-178. Those in the art having the benefit of this disclosure will appreciate that the vessels 111-118 will typically traverse a number of such sail lines in the course of a survey. The sail lines 171-178 are determined a priori from well known considerations such as survey coverage, sampling requirements, economic budgets, and survey objectives. Note, however, that the presently disclosed technique will affect how those considerations are applied, particularly with respect to spread dimensional characteristics such as sail line interval and source separation.

The relative positions of the vessels 111-118 described above, as well as the shape and depth of the streamers 140, may be maintained while traversing the respective sail lines 171-177 using control techniques known to the art. Any suitable technique known to the art may be used. Suitable techniques includes those disclosed in U.S. Pat. No. 6,671,223, U.S. Pat. No. 6,932,017, U.S. Pat. No. 7,080,607, U.S. Pat. No. 7,293,520, and U.S. application Ser. No. 11/114,773, incorporated by reference below.

Note that the sail lines 175-178 for the vessels 115-118 on the trailing edge 160 of the spread 100 are "interleaved" with the sail lines 171-174 for the vessels 111-114 at the leading edge 150 of the spread 100. It is this interleaving that creates the interval separation $S_i$ between the sail lines 171-178, which effectively produces a source separation in this particular embodiment since the sources 131-138 are each towed directly behind their respective vessels 115-118. Thus, given these dimensions and the number and locations of the receivers 156 and sources 131-138, this spread 100 can cover a typical survey area in a single pass rather than the two required by conventional techniques.

A survey employing two receiver vessels (e.g., vessels 111, 114) and six source vessels (e.g., vessels 132-133, 135-138) as described above, is a single pass survey, saves time and is therefore less expensive than a conventional survey. It will yield the same fold as for a two receiver vessel, two source vessel survey with two pass at a cost saving equivalent to twice the cost of a receiver vessel per day less twice the cost of a receiver vessel per day.

In the illustrated embodiment, combinations of the sources 131-138 are fired sequentially, the individual sources 131-138 in any given combination being fired simultaneously. The use of eight sources in a sequential mode increases the inline interval between shot points as the vessels 111-118 traverse their respective sail lines 171-177. For instance, if the nominal shot interval is ds, the inline shot interval for each source line will be 8*ds, i.e., similar with the inline source sampling of the two streamers and two sources, if a simultaneous source shooting technique is used. One possible shooting sequence is: source 131+source 135, source 132+source 136, source 133+source 137, and source 134+source 138. If the nominal shot interval is 37.5 m, the shot sampling in the inline direction will be 150 m. This is equivalent to the sampling achieved by a two receiver vessels, two source vessel survey using sequential shooting.

Figure 1C:
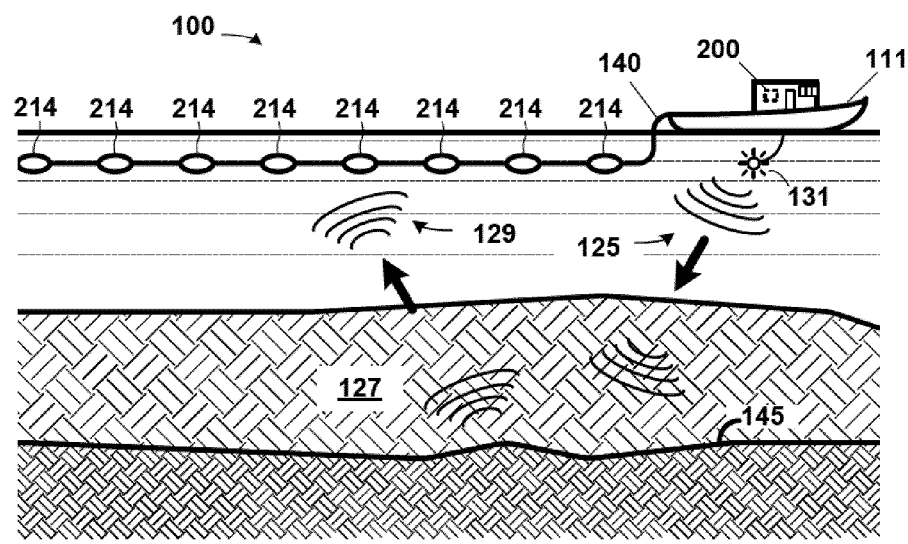
FIG. 1C depicts, in part, a wide-azimuth seismic survey in accordance with another aspect of the present invention using the spread of FIG. 1A.

FIG. 1C depicts a portion of the spread 100 of FIG. 1A in a "snapshot" during a survey. For the sake of clarity, and so as not to obscure this aspect of the invention, some detail is omitted. For example, only the streamer vessel 111, streamer array 121, and source 131 are shown because the operation of the other spread elements can readily be extrapolated therefrom. Some elements of the streamer 140, namely the positioning devices, are likewise omitted for the same reason. A subterranean geological formation 127 presents a seismic reflector 145.

The seismic source 131 generates a plurality of seismic survey signals 125 in accordance with conventional practice as the survey vessel 111 tows the streamers 140 across the area to be surveyed in a predetermined pattern as disclosed above. The seismic survey signals 125 propagate and are reflected by the subterranean geological formation 127. The receivers 214 detect the reflected signals 129 from the geological formation 127 in a conventional manner. The receivers 214 then generate data representative of the reflections 129, and the seismic data is embedded in electromagnetic signals.

The signals generated by the receivers 214 are communicated to the data collection unit 200. The data collection unit 200 collects the seismic data for processing. The data collection unit 200 may process the seismic data itself, store the seismic data for processing at a later time, transmit the seismic data to a remote location for processing, or some combination of these things. In general, the data is typically transported or transmitted to another location where it is combined with that acquired on the other vessels 112-118 for processing and analysis.

The survey signals 125 mentioned above are generated by "shooting" the sources, e.g., the source 131. In accordance with one aspect of the present invention, the sources are shot in combinations that are shot sequentially in an interval proportional to the number of seismic sources and the nominal shot interval. In the illustrated embodiment, the shot interval is the product of the number of seismic sources and the nominal shot interval. So, as described above, for the eight vessel configuration of FIG. 1A, the inline shot interval for each source line will be 8*ds.

Due to the fact that the acquisition time is reduced by half by using the embodiment of FIG. 1A, the cost to acquire the same survey size relative to that of the conventional WAZ survey described above. If N days are required to acquire the survey with the conventional approach, only N/2 days will be required for the embodiment of FIG. 1A. This means that the cost saving of:

$$2Rc-2Sc$$

where Rc is the receiver vessels cost per day and Sc is the source vessel cost per day. Note that Sc is typically a fraction of Rc. Another indirect benefit is the reduced acquisition time which means better vessel utilization and another survey can be acquired.

Figure 3:
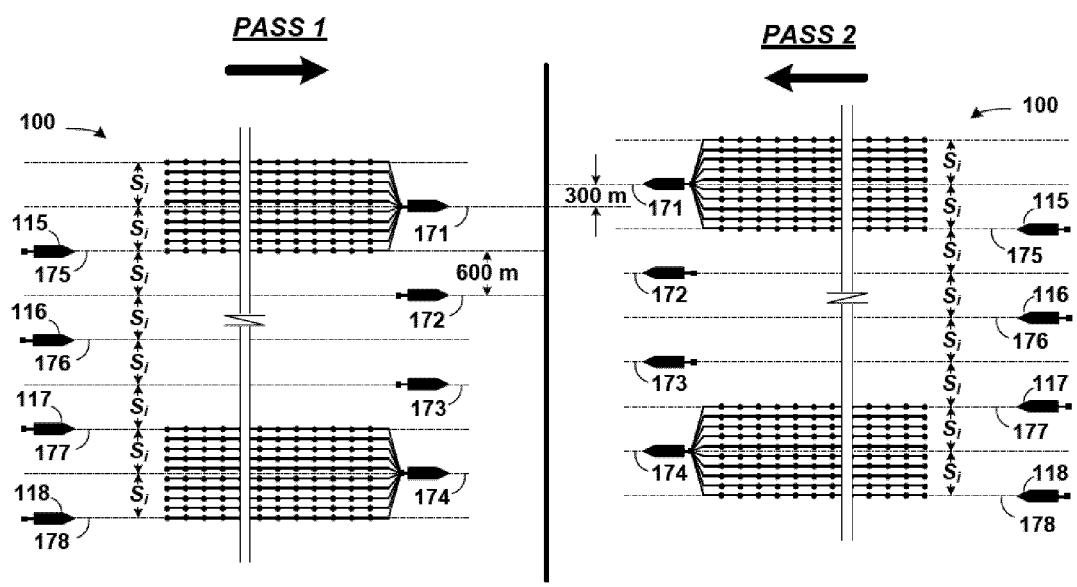
FIG. 3 illustrates certain aspects of a two-pass survey using the spread of FIG. 1A.

If the survey area is sufficiently large that even the spread 100 still cannot cover it in one pass, it can cover the area in half the number of passes that a conventional spread would require. FIG. 3 illustrates how the positioning of the spread in a two-pass survey can be leveraged to achieve a greater sail line interval. (Note that the trailing edge vessels 115-118 are aligned with the port rather than the starboard edge of the array as in FIG. 1A.) Pass 1 is shown to the left of the heavy line and travels in the direction indicated by the arrow under the legend "Pass 1". Pass 2 is shown to the right of the heavy line and travels in the direction indicated by the arrow under the legend "Pass 2". The positioning of the spread 100 during the passes is "interleaved" between the two passes. In particular, the separation interval $S_i$=600 m and the sail lines 171-178 are offset between Pass 1 and Pass 2 by 300 m to achieve a 2400 m sail line interval with a source line interval of 300 m. That is, 300 m shot crossline sampling can be acquired by shooting interleaved with two passes at 2400 m sail line interval.

The cost of acquiring data with 2400 m interleaved sail lines as shown in FIG. 3 is the same as acquiring the data with tow receiver arrays and six sources in one pas at a 1200 m sail line interval—i.e., the embodiment of FIG. 1A. However, by staggering the sail line with 300 m one can improve the crossline sampling by acquiring 300 m source line interval. Simultaneous shooting is used in order to increase the inline shot interval as we did in the previous embodiment of FIG. 1A.

Figure 4A:
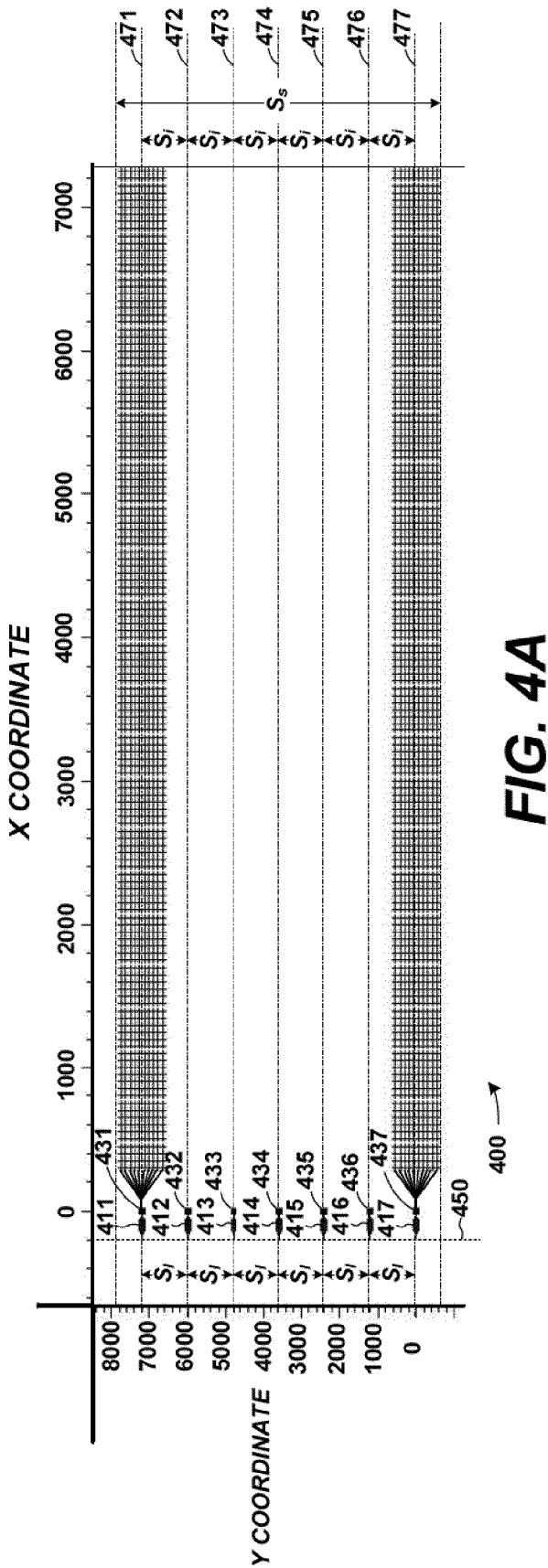
FIG. 4A-FIG. 4B conceptually illustrates in a "bird's eye" view a second particular embodiment of a towed array, marine seismic survey spread implemented in accordance with one aspect of the present invention and the wide-azimuth distribution of its acquisition, respectively.
Figure 4B:
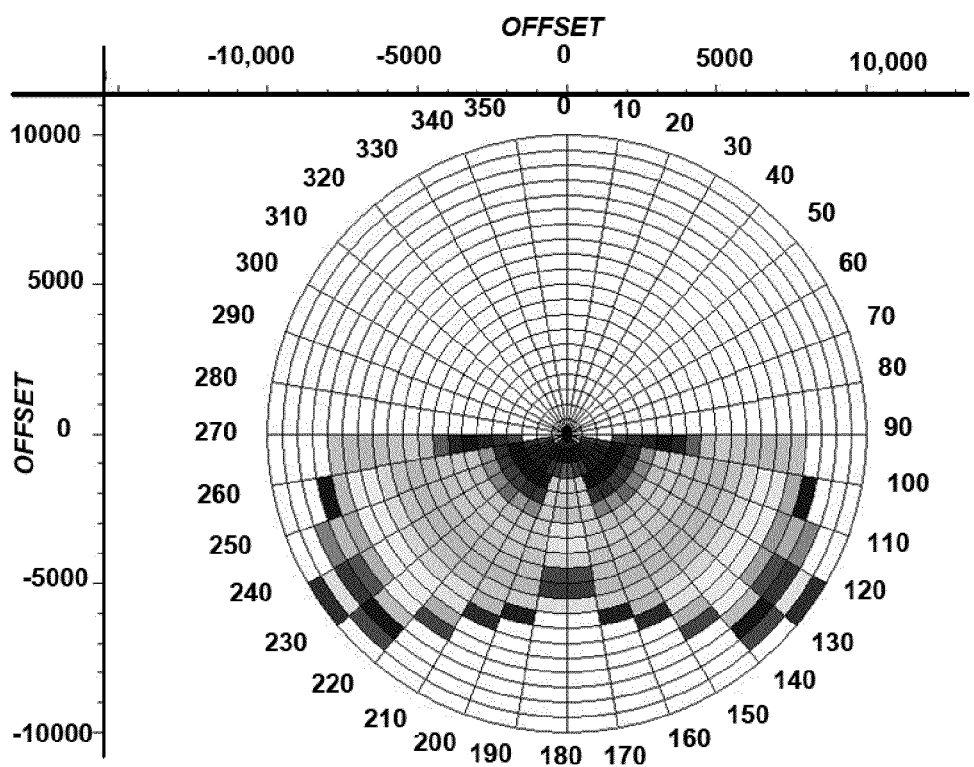

The presently disclosed technique also admits variation in the number of spread elements that might be employed and their positioning. Consider, for example, the spread 400 of FIG. 4A-FIG. 4B. FIG. 4A-FIG. 4B conceptually illustrates in a "bird's eye" view a second particular embodiment of a towed array, marine seismic survey spread implemented in accordance with one aspect of the present invention and the wide-azimuth distribution of its acquisition, respectively.

The spread 400 comprises seven survey vessels 411-417, of which vessels 411, 417 are receiver vessels and the remainder are source vessels. Each of the vessels 411-417 also tows a respective source 431-437. Note that all of the vessels 401-407 are located at the leading edge 450 of the spread 400. The sail lines 471-477 are separated by a separation interval $S_i$=1200 m. However, through simultaneous shooting, the same interleaved effect realized by the embodiment of FIG. 1A-FIG. 1B can still be realized. One possible shooting sequence could be source 431+source 435, source 432+source 436, source 434, and source 433+source 437. This embodiment also provides larger crossline offsets than does a two receiver vessel, two source vessel spread with maximum crossline offset up to 10 km.

Techniques can also be employed to reduce the number of vessels. In this vein, consider the embodiment of FIG. 5. The spread 500 comprises four vessels 501-504, of which vessels 501, 504 are receiver vessels and vessels 502, 503 are source vessels. Each of the vessels 501-504 tows a dual source array 581-584, comprised of sources 531a-534b. Each pair of sources is separated by a distance d. The distance d should be proportional to the sail line interval. It could be some fraction (e.g., ¼, ½, or ⅓) the spread width. In the illustrated embodiment, the spread width is 1200 m, and so the distance d might be, for example, 300 m, 400 m, 600 m, or 1200 m.

In the embodiment illustrated, the source separation is 300 m. This is more efficient for development projects. For instance, a 600 m sail line interval with two interleaved passes, will yield 150 m crossline shot sampling and 376 fold. This is double the fold achieved using conventional techniques. Again, the sources 531-534 will be shot simultaneously as described above.

Figure 5:
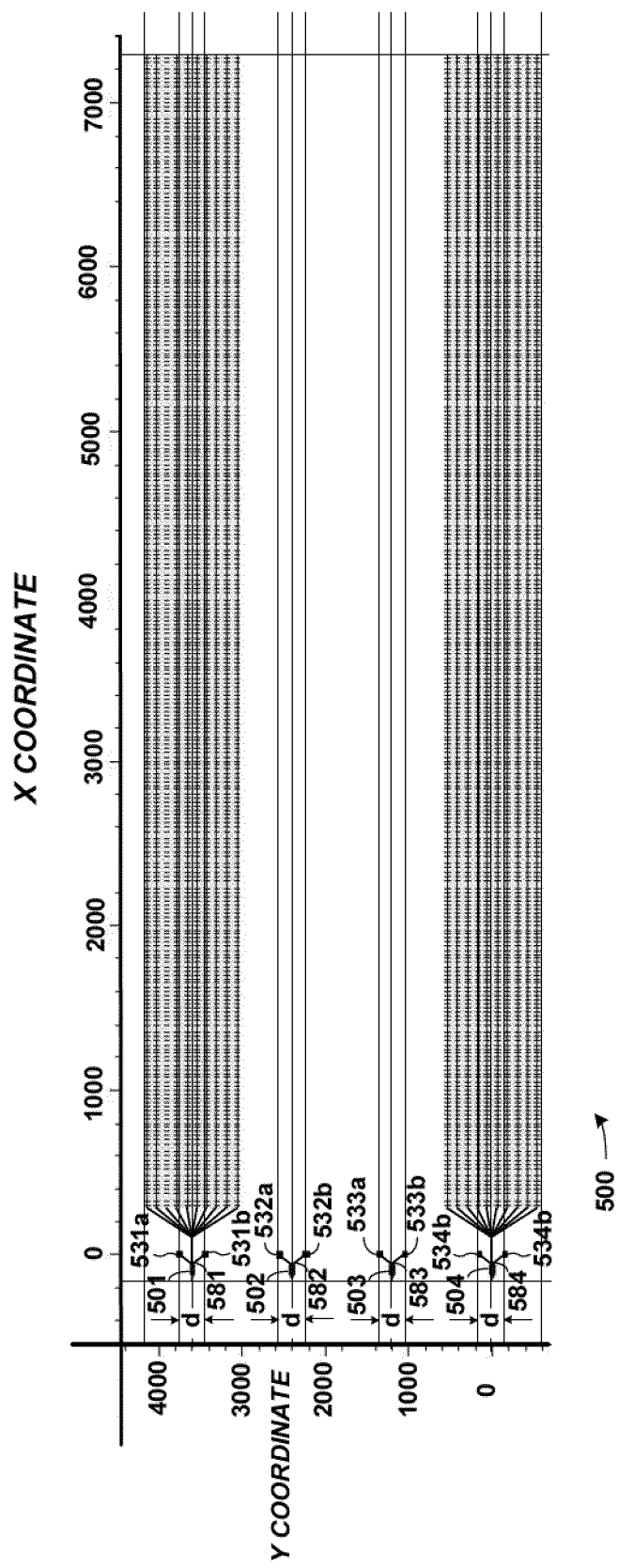
FIG. 5-FIG. 7 conceptually illustrates in a "bird's eye" views still other alternative embodiments of a towed array, marine seismic survey spread implemented in accordance with one aspect of the present invention.
Figure 6:
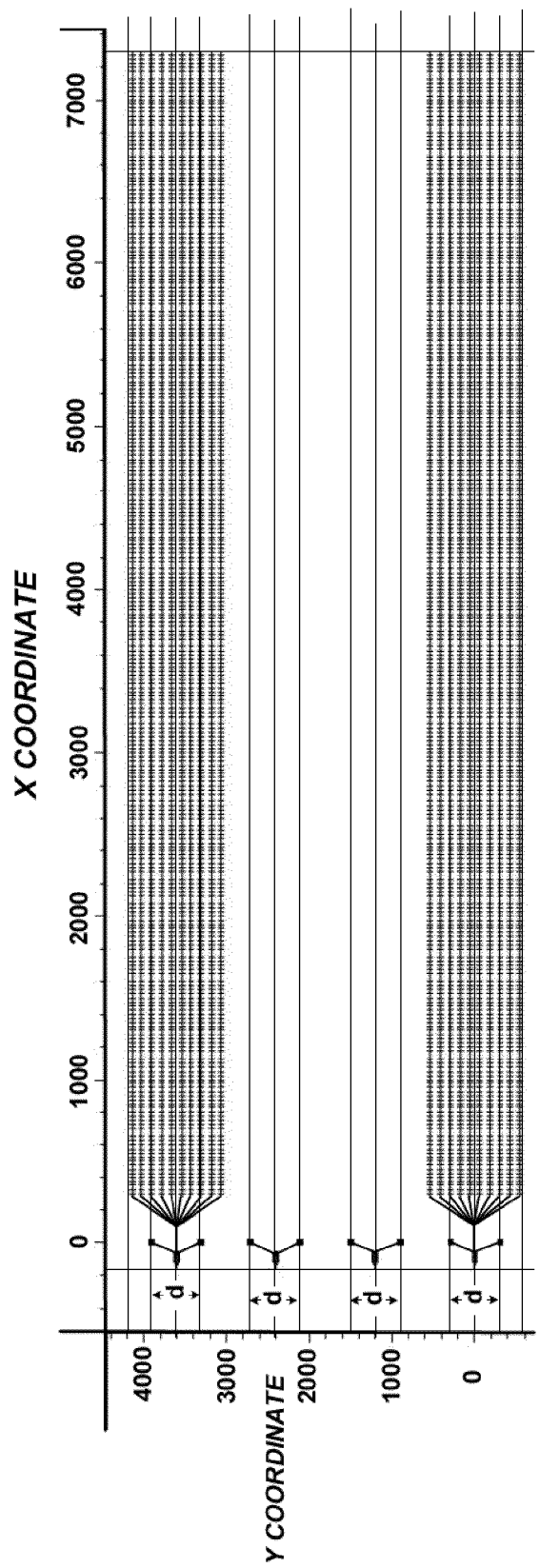

FIG. 6 depicts a variation on the dual source array configuration of FIG. 5 employing a 600 m source separation instead of 300 m. This yields a source crossline sampling 300 m. With a 1200 m sail line interval with two interleaved passes, a 300 m crossline shot sampling can be achieved. Again, simultaneous source shooting is employed.

Figure 7:
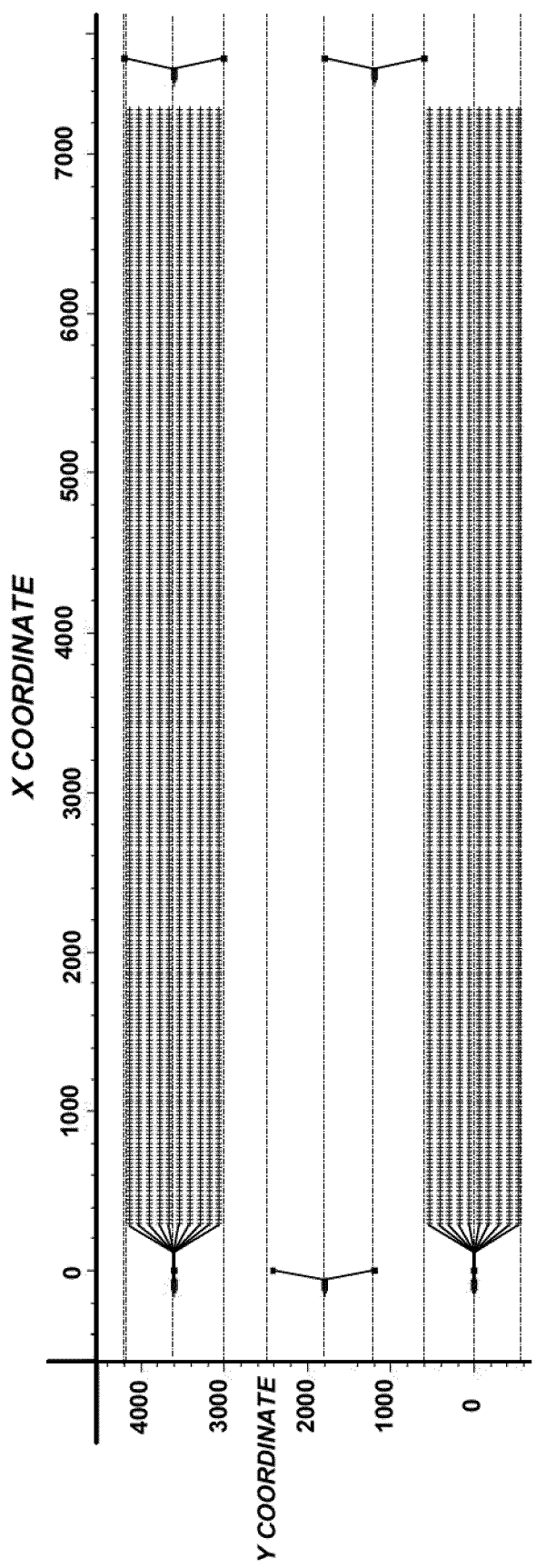

FIG. 7 depicts an embodiment that may be considered a variation on both the embodiments of FIG. 1A and FIG. 5. It is a variation on the embodiment of FIG. 1 in that it employs dual source arrays to reduce the number of vessels. It is a variation on the embodiment of FIG. 5 in that vessels are located on the trailing edge of the spread and the sources separation is 1200 m. Wide azimuth ("WAZ") acquisition for exploration could be shot in a single pass, or half the time, of a conventional survey at a substantial cost savings. This configuration is good also for 4D survey using what is known as the "push-reverse" technique.

Thus, the presently disclosed technique provides 300 m crossline sampling in a cost effective survey relative to conventional surveying techniques. This is achieved by deploying a plurality of seismic sources positioned to achieve a 300 m crossline sampling as a function of the number of passes. If a survey in one pass is contemplated, then the sources are deployed with a 300 m source separation. If a survey in two passes is contemplated, then the sources can be deployed with a 600 m source separation and the position of the spread during the two passes with a crossline offset to achieve a 300 m source separation in the combined passes. This is described as "interleaving" herein, wherein the source are interleaved as deployed in the spread, as positioned in multiple passes, or some combination of these things.

The presently disclosed technique also provides a method by which wide-azimuth seismic data may be obtained in a towed array marine survey. The method generally comprises deploying a towed array, marine seismic spread; traversing the deployed spread across a survey area; and acquiring wide azimuth survey data during the traversal. The acquisition includes: shooting the seismic sources in combination sequentially in an interval proportional to the number of seismic sources and the nominal shot interval; and receiving a seismic wavefield generated by shooting the seismic sources. In the embodiments illustrated, interval is the product of number of seismic sources and the nominal shot interval.

The following documents are hereby incorporated by reference for the noted teaching as if set forth herein verbatim:

U.S. Pat. No. 4,757,482, entitled, "Modular Airgun Array Method, Apparatus and System", and issued Jul. 12, 1988, to Bolt Technology Corporation, as assignee of the inventor Augustus H. Fiske, Jr. for its teachings seismic source design and construction;

U.S. Pat. No. 6,477,711, entitled, "Method of Making a Marine Seismic Streamer", and issued Nov. 5, 2002, to Schlumberger Technology Corporation, as assignee of the inventors Nils Lunde, et al., for its teachings regarding streamer design and construction;

U.S. Pat. No. 6,671,223, entitled, "Control Devices for Controlling the Position of a Marine Seismic Streamer", and issued Dec. 30, 2003, to WesternGeco, LLC, as assignee of the inventor Simon Hastings Bittleston, for its teachings regarding streamer design and construction as well as its teachings about spread control;

U.S. Pat. No. 6,684,160, entitled, "Marine Seismic Acquisition System and Method", and issued Jan. 27, 2004, to WesternGeco, LLC, as assignee of the inventors Ali Osbek et al., for its teachings regarding streamer design and construction;

U.S. Pat. No. 6,932,017, entitled, "Control System for Positioning of Marine Seismic Streamers", and issued Aug. 23, 2005, to WesternGeco, LLC, as assignee of the inventors Øyvind Hillesund and Simon Bittleston for its teachings regarding streamer design and construction as well as its teachings about spread control;

U.S. Pat. No. 7,080,607, entitled, "Seismic Data Acquisition Equipment Control System", and issued Jul. 25, 2006, to WesternGeco LLC, as assignee of the inventors Øyvind Hillesund and Simon Bittleston for its teachings regarding streamer design and construction as well as its teachings about spread control;

U.S. Pat. No. 7,293,520, entitled, "Control System for Positioning of Marine Seismic Streamers", and issued Nov. 13, 2007, to WesternGeco LLC, as assignee of the inventors Øyvind Hillesund and Simon Bittleston for its teachings regarding streamer design and construction as well as its teachings about spread control;

U.S. application Ser. No. 11/114,773, entitled, "Seismic Streamer System and Method", and filed Apr. 26, 2005, in the name of the inventors Rohitashva Singh et al. for its teachings regarding multicomponent streamer design, construction and operation; and Beasley, C, J & R. E., Chambers, 1998, "A New Look at Simultaneous Sources", 60$^{th}$ Conference and Exhibition, EAGE, Extended Abstracts, 02-38, for its teachings regarding source separation techniques.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   deploying a towed array, marine seismic spread, the spread including:
      a plurality of streamer arrays;
      a plurality of streamer vessels, each streamer vessel towing a respective one of the streamer arrays; and
      a plurality of source vessels, each source vessel towing one or more seismic sources from a plurality of seismic sources;
   traversing the deployed spread across a survey area such that the sail lines of vessels on the leading edge of the deployed spread are interleaved with the sail lines of vessels on the trailing edge of the deployed spread;
   shooting one or more combinations of seismic sources from the plurality of seismic sources according to a source crossline separation interval, wherein the seismic sources in at least one of the combinations are separated by the crossline separation interval and wherein the crossline separation interval is used to separate data attributable to the seismic sources in the at least one of the combinations; and
   acquiring wide azimuth survey data during the traversal.

2. The method of claim 1, wherein the sources in the one or more combinations are shot sequentially according to an inline shot interval.

3. The method of claim 2, wherein the inline shot interval comprises the sum of a plurality of nominal shot intervals corresponding to the seismic sources.

4. The method of claim 1, wherein deploying the source vessels comprises deploying the seismic sources for each vessel at a crossline source separation of 300 meters for acquisition in a single pass.

5. The method of claim 1, wherein deploying the source vessels comprises deploying the seismic sources for each vessel at a crossline source separation of 600 meters for acquisition in two passes.

6. The method of claim 1, wherein the wide azimuth survey data is acquired in a single pass.

7. The method of claim 1, wherein shooting the seismic sources in combinations further comprises shooting at least two seismic sources substantially simultaneously.

8. The method of claim 1, wherein shooting the combinations achieves a source crossline sampling for the survey area that is less than the crossline separation interval between leading edge source vessels in the deployed spread.

9. A method, comprising:
   deploying a towed array, marine seismic spread having a plurality of streamer arrays and a plurality of seismic sources;
   traversing the deployed spread across a survey area; and
   acquiring wide azimuth survey data during the traversal, comprising:
      shooting one or more combinations of seismic sources from the plurality of seismic sources in an interleaved manner such that at least one of the combinations comprises at least two seismic sources that are shot substantially simultaneously and have source lines separated in the crossline direction; and
      receiving a seismic wavefield generated by shooting the seismic sources.

10. The method of claim 9, wherein the traversal comprises a single pass.

11. The method of claim 9, wherein the traversal comprises two interleaved passes.

12. The method of claim 9, wherein receiving the seismic wavefield comprises detecting the pressure and particle motion of the seismic wavefield.

13. The method of claim 9, wherein the wide azimuth survey data is acquired in a single pass.

14. The method of claim 9, wherein the seismic sources shot in combinations comprise a source located substantially proximate to the leading edge of the seismic spread and a source located substantially proximate to the trailing edge of the seismic spread.

15. The method of claim 9, wherein shooting the seismic sources in combinations comprises shooting the seismic sources sequentially according to an inline shot interval.

16. The method of claim 9, wherein shooting the combinations of sources is performed such that data attributable to one of the seismic sources in a combination is separable from data attributable to other sources within the combination.

17. The method of claim 9, wherein shooting the combinations achieves a source crossline sampling for the survey area that is less than the crossline separation interval between the source vessels.

18. The method of claim 9, wherein shooting the combinations achieves a source crossline sampling for the survey area that is a function of the number of passes across the survey area.

* * * * *